United States Patent
Gude et al.

(10) Patent No.: US 9,357,488 B2
(45) Date of Patent: May 31, 2016

(54) DEVICES AND METHODS FOR FACILITATING REACQUISITION PROCEDURES

(71) Applicant: Qualcomm Incorporated, San Diego, CA (US)

(72) Inventors: Venkata Siva Prasad Gude, Hyderabad (IN); Debesh Kumar Sahu, Hyderabad (IN); Jagadishwar Neela, Hyderabad (IN); George Cherian, San Diego, CA (US)

( * ) Notice: Subject to any disclaimer, the term of this patent is extended or adjusted under 35 U.S.C. 154(b) by 366 days.

(21) Appl. No.: 13/739,480

(22) Filed: Jan. 11, 2013

(65) Prior Publication Data

US 2014/0198693 A1    Jul. 17, 2014

(51) Int. Cl.
| | |
|---|---|
| H04W 52/02 | (2009.01) |
| H04B 1/7075 | (2011.01) |
| G08C 17/00 | (2006.01) |
| H04W 76/04 | (2009.01) |

(52) U.S. Cl.
CPC ......... *H04W 52/0216* (2013.01); *H04B 1/7075* (2013.01); *H04W 76/048* (2013.01); *Y02B 60/50* (2013.01)

(58) Field of Classification Search
CPC .......... H04W 52/0216; H04W 76/048; H04B 1/7075; Y02B 60/50
USPC ....................................... 370/311
See application file for complete search history.

(56) References Cited

U.S. PATENT DOCUMENTS

| | | | |
|---|---|---|---|
| 5,790,589 A | 8/1998 | Hutchison, IV et al. | |
| 5,920,549 A * | 7/1999 | Bruckert ........... | H04W 36/0083 370/331 |
| 6,101,173 A | 8/2000 | Bayley | |
| 6,775,252 B1 | 8/2004 | Bayley | |
| 8,098,630 B2 * | 1/2012 | Tod et al. ..................... | 370/332 |
| 8,121,596 B1 * | 2/2012 | Shetty et al. ................. | 455/434 |
| 8,169,957 B2 | 5/2012 | Damnjanovic | |
| 8,843,162 B2 * | 9/2014 | Oroskar ................ | H04W 60/00 455/343.1 |

(Continued)

FOREIGN PATENT DOCUMENTS

WO    2011084024 A2    7/2011

OTHER PUBLICATIONS

International Search Report and Written Opinion—PCT/US2013/077309—ISA/EPO—Apr. 23, 2014.

*Primary Examiner* — Guang Li
*Assistant Examiner* — Faisal Choudhury
(74) *Attorney, Agent, or Firm* — Qualcomm IP Dept.; James Hunt Yancey, Jr.

(57) ABSTRACT

Access terminals are adapted to facilitate reacquisition procedures for a slotted idle mode. According to one example, an access terminal can operate in a slotted idle mode. The access terminal can then determine one or more optimized parameters for reacquisition procedures. In one example, the access terminal can determine an optimized length of time for reacquisition periods by incrementally reducing the length of time for reacquisition periods until an optimized length of time is obtained. In another example, the access terminal can determine an optimized number of pseudorandom noise (PN) signals and PN positions to be stored during each awake state of the slotted idle mode by incrementally reducing the number of PN signals and PN positions that are stored until an optimized number of stored PN signals and PN positions is obtained. Other aspects, embodiments, and features are also included.

23 Claims, 8 Drawing Sheets

(56) References Cited

U.S. PATENT DOCUMENTS

| | | | | |
|---|---|---|---|---|
| 2004/0120278 A1* | 6/2004 | Krantz | ................. | H04W 48/16 370/328 |
| 2005/0245269 A1* | 11/2005 | Demirhan | ............ | H04W 24/00 455/452.1 |
| 2007/0064655 A1* | 3/2007 | Ruuska | ................ | H04W 48/16 370/332 |
| 2008/0014958 A1* | 1/2008 | Kim et al. | .................. | 455/452.2 |
| 2008/0220762 A1* | 9/2008 | Welnick et al. | ............ | 455/422.1 |
| 2009/0052428 A1* | 2/2009 | Ryu | ....................... | H04L 12/66 370/350 |
| 2010/0080156 A1* | 4/2010 | Nichols | ............ | H04W 52/0216 370/311 |
| 2010/0091643 A1 | 4/2010 | Tu et al. | | |
| 2010/0255835 A1 | 10/2010 | Suzuki et al. | | |
| 2011/0237252 A1* | 9/2011 | Kim et al. | ..................... | 455/434 |
| 2012/0115471 A1 | 5/2012 | Awoniyi et al. | | |
| 2014/0179320 A1* | 6/2014 | Jang | ...................... | H04W 36/30 455/436 |

\* cited by examiner

DEVICES AND METHODS FOR FACILITATING REACQUISITION PROCEDURES

TECHNICAL FIELD

The technology discussed in this patent application relates generally to wireless communications, and more specifically, to methods and devices for facilitating reacquisition procedures for access terminals operating in a slotted idle mode.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

A variety of devices are adapted to utilize such wireless communications systems. Such devices may be generally referred to as access terminals. Some access terminals may be stationary, or at least substantially stationary, such as access terminals adapted for machine-to-machine (M2M) communications (also sometimes referred to as machine-type communication or MTC). An M2M adapted access terminal may include an access terminal that is adapted to operate at least substantially without user interaction. M2M adapted access terminals may operate on a limited power source, such as a battery.

BRIEF SUMMARY OF SOME EXAMPLES

The following presents a summary of one or more aspects of the present disclosure to provide a basic understanding of various aspects. This summary is not an extensive overview of all contemplated features of the disclosure, and is intended neither to identify key or critical elements of all aspects of the disclosure nor to delineate the scope of any or all aspects of the disclosure. The summary's sole purpose is to present some concepts of one or more aspects of the disclosure in a simplified form as a prelude to the more detailed description that is presented later.

In some instances, features which may conserve power and assist in extending the operating life of an access terminal's limited power source can be beneficial. Various features and aspects of the present disclosure are adapted to facilitate power conservation in access terminal by facilitating optimized slotted mode operations. According to at least one aspect of the present disclosure, power-conserving wireless communication devices may include a storage medium with programming. The storage medium can be operably coupled with a processing circuit adapted to execute the programming to systematically adjust one or more parameters for reacquisition procedures. Adjustments or modifications in reacquisition can lead to reduced processing thereby not only conserving power but also efficiently using power.

Further aspects include access terminals with a communications interface and a storage medium coupled to a processing circuit. The processing circuit can be adapted to initially obtain a default duration for reacquisition periods. The processing circuit can subsequently determine an optimized duration for reacquisition periods, and perform one or more reacquisition procedures using the optimized duration.

Yet further aspects of the present disclosure provide methods operational on an access terminals and/or access terminals including means to perform such methods. One or more examples of such methods may include operating in a slotted idle mode, and determining one or more optimized parameters for reacquisition procedures.

Still further aspects include computer-readable storage mediums comprising programming operational on a computer, such as an access terminal. According to one or more examples, such programming may be adapted for causing a computer to operate in a slotted idle mode. The programming may further be adapted for causing the computer to determine one or more optimized parameters for reacquisition procedures, such as an optimized duration for reacquisition periods and/or an optimized number of pseudorandom noise (PN) signals and PN positions for use in reacquisition procedures.

Additional embodiments are also contemplated. For example, another method embodiment can include a method of wireless communication operable at an access terminal operating in a slotted mode. The method can generally comprise receiving an information element indicating a duration of a reacquisition window, and performing a reacquisition attempt utilizing a modified duration different than the indicated duration for the reacquisition window. Another embodiment can include a communication device operable in a communication system comprising components configured for wireless communication. The communication device can generally comprise a reacquisition module configured to receiving an information element indicating a duration of a reacquisition window; and a processor configured to modify the reacquisition window to enable optimal reacquisition.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for CDMA and 3rd Generation Partnership Project 2 (3GPP2) 1× protocols and systems, and related terminology may be found in much of the following description. However, those of ordinary skill in the art will recognize that one or more aspects of the present disclosure may be employed and included in one or more other wireless communication protocols and systems.

Figure 1:
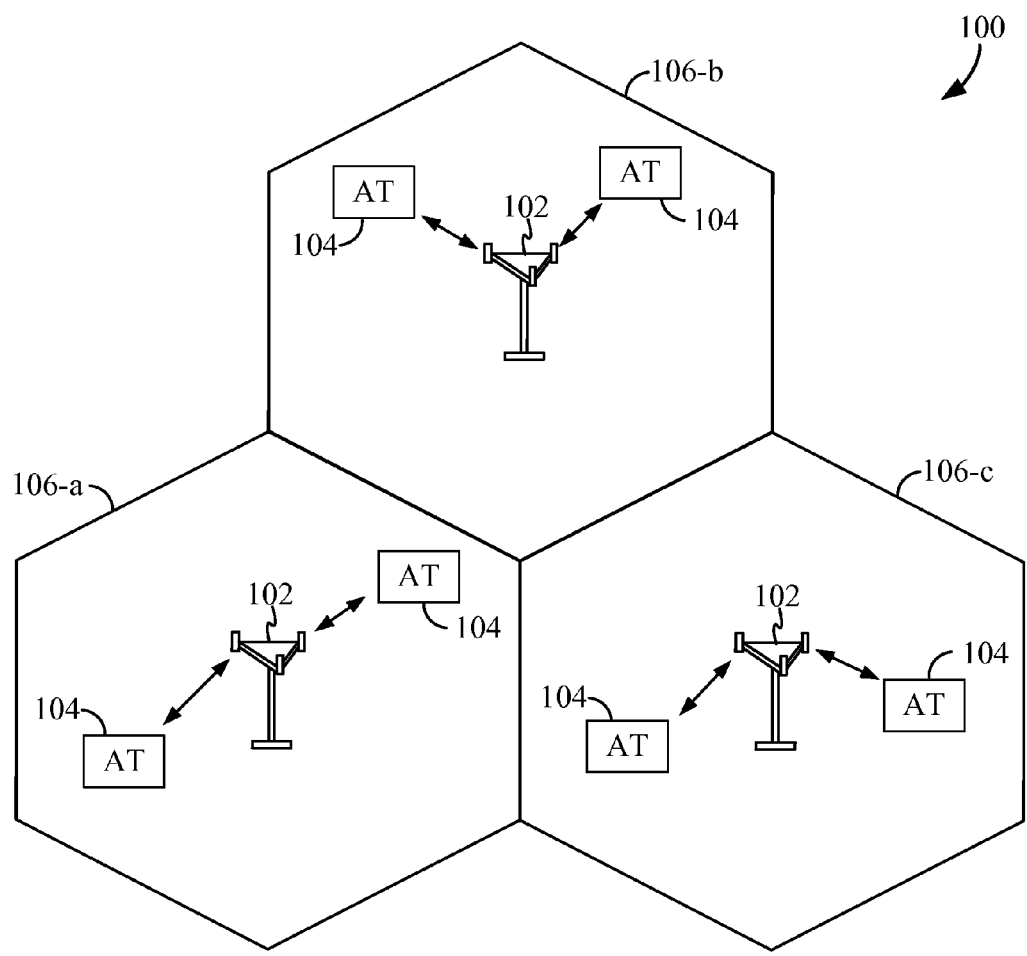
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communications system 100 is adapted to facilitate wireless communication between one or more base stations 102 and access terminals 104. The base stations 102 and access terminals 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

Figure 2:
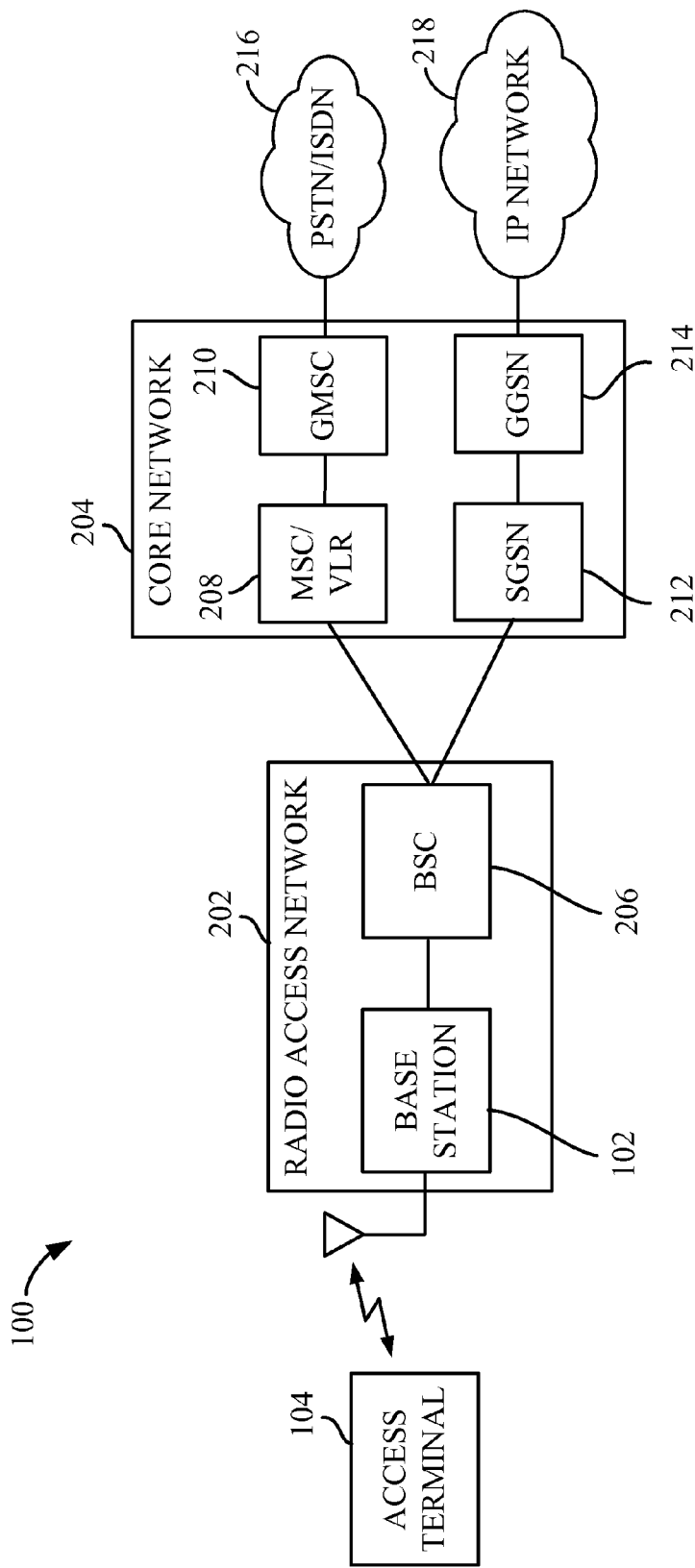
FIG. 2 is a block diagram illustrating select components of the wireless communication system of FIG. 1 according to some embodiments.

The base stations 102 are configured to communicate with the access terminals 104 under the control of a base station controller (see FIG. 2). Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). In various examples, the system 100 may include base stations 102 of different types.

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal. Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a meter, an entertainment device, a sensor, a computing device, an electric device, a machine-to-machine (M2M) device, and/or other communication/computing device which communicates, at least partially, through a wireless or cellular network.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as an EIR, a HLR, a VLR and/or a AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

Figure 3:
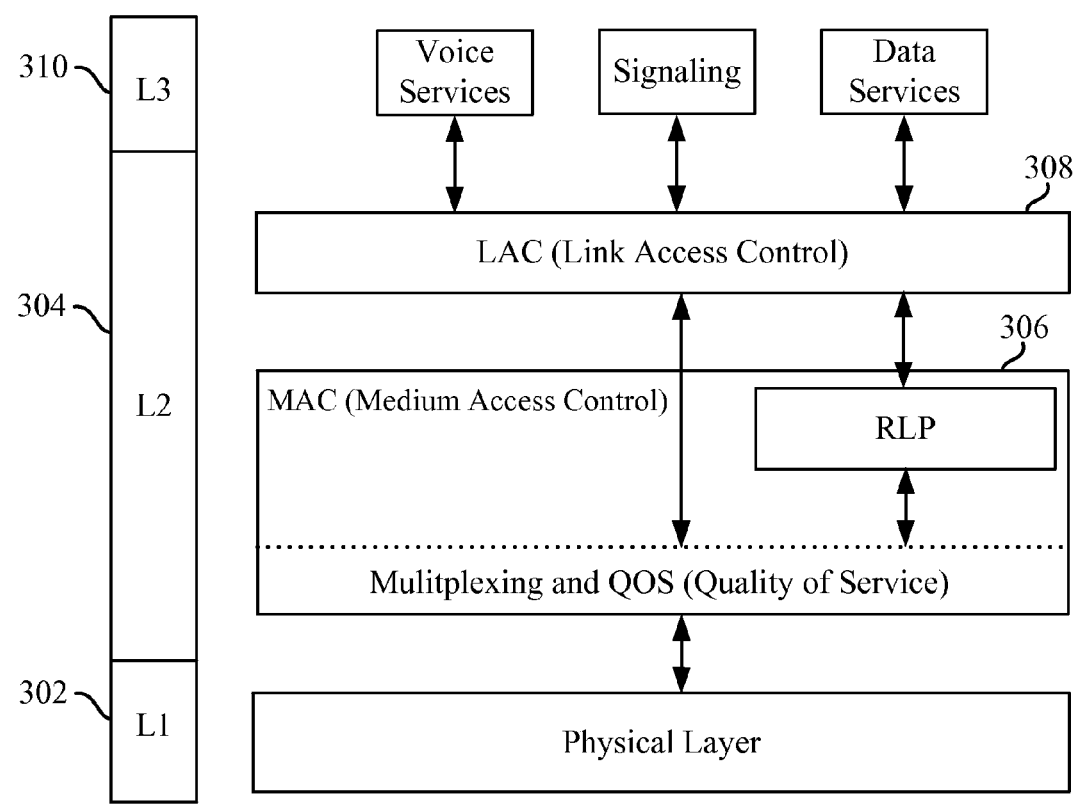
FIG. 3 is a block diagram illustrating an example of a protocol stack architecture which may be implemented by an access terminal according to some embodiments.

Access terminals 104 typically employ a protocol stack architecture for communicating data between the access terminal 104 and one or more network nodes of the wireless communication system 100 (e.g., the base station 102, base station controller 206). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 3 is a block diagram illustrating an example of a protocol stack architecture which may be implemented by an access terminal 104. The protocol stack architecture is shown in FIG. 3 to generally include three layers: Layer 1 (L1), Layer 2 (L2), and Layer 3 (L3). Layer 1 302 is the lowest layer and implements various physical layer signal processing functions. Layer 1 302 is also referred to herein as the physical layer 302. This physical layer 302 provides for the transmission and reception of radio signals between the access terminal 104 and a base station 102.

The data link layer, called layer 2 (or "the L2 layer") 304 is above the physical layer 302 and is responsible for delivery of signaling messages generated by Layer 3. The L2 layer 304 makes use of the services provided by the physical layer 302. The L2 layer 304 may include two sublayers: the Medium Access Control (MAC) sublayer 306, and the Link Access Control (LAC) sublayer 308.

The MAC sublayer 306 is the lower sublayer of the L2 layer 304. The MAC sublayer 306 implements the medium access protocol and is responsible for transport of higher layers' protocol data units using the services provided by the physical layer 302. The MAC sublayer 306 may manage the access of data from the higher layers to the shared air interface.

The LAC sublayer 308 is the upper sublayer of the L2 layer 304. The LAC sublayer 308 implements a data link protocol that provides for the correct transport and delivery of signaling messages generated at the layer 3. The LAC sublayer makes use of the services provided by the lower layers (e.g., layer 1 and the MAC sublayer).

Layer 3 310, which may also be referred to as the upper layer or the L3 layer, originates and terminates signaling messages according to the semantics and timing of the communication protocol between a base station 102 and the access terminal 104. The L3 layer 310 makes use of the services provided by the L2 layer. Information (both data and voice) message are also passed through the L3 layer 310.

As an access terminal 104 operates within the system 100, the access terminal 104 may employ various modes of operation, including a dedicated mode and an idle mode. In dedicated mode, the access terminal 104 may actively exchange data (e.g., voice or data calls or sessions) with one or more base stations (e.g., base stations 102 in FIG. 1). In idle mode, the access terminal 104 may monitor control channels, such as a paging channel (PCH) for paging messages. Paging messages may include messages that alert the access terminal 104 to the occurrence of an incoming voice or data call as well as control/overhead messages that carry system information and other information for the access terminal 104. In implementations employing 3GPP2 1× protocols and technologies, also referred to as CDMA 2000 1×, some control/overhead messages may include a system parameters message (SPM), an extended system parameters message (ESPM), an access parameters message (APM), etc.

When operating in the idle mode, paging messages may be sent on a paging channel to the access terminal 104 at designated time intervals. Instead of monitoring the paging channel continuously, the access terminal 104 can conserve power by periodically monitoring the paging channel in a slotted idle mode, which may also be referred to by those of skill in the art as discontinuous reception mode or DRX mode. In the slotted idle mode, the access terminal 104 wakes up from a "sleep" state at known time intervals, enters an "awake" state and processes the paging channel for messages. If additional communication is not required, the access terminal 104 can return to the sleep state until the next designated time.

Figure 4:
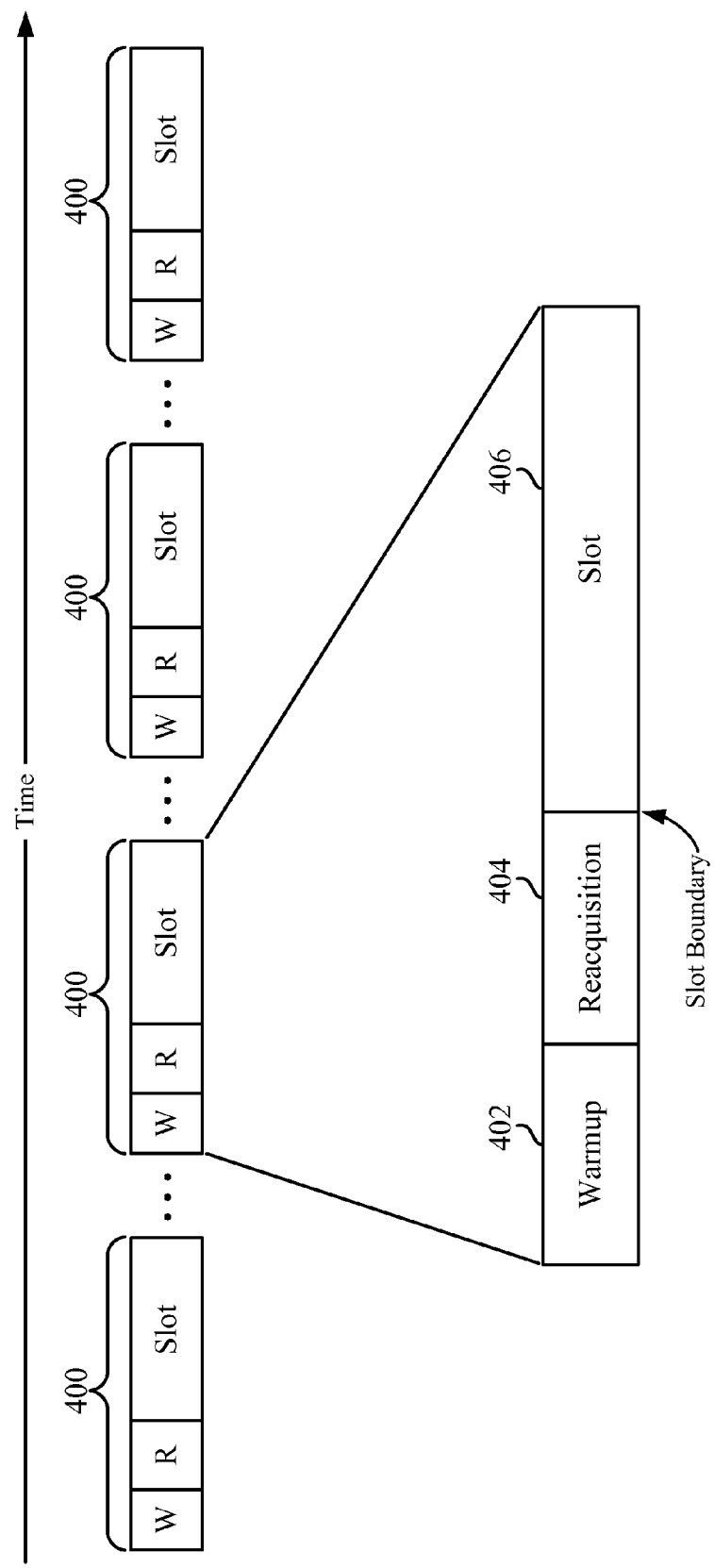
FIG. 4 is a block diagram illustrating the repetition of the awake states, as well as some particular aspects of awake states in a slotted idle mode according to some embodiments.

FIG. 4 is a block diagram illustrating the repetition of the awake states, as well as some particular aspects of awake states in a slotted idle mode according to at least one example. As shown in FIG. 4, the access terminal 104 periodically enters awake states 400 at predetermined intervals. At the beginning of each awake state 400, and prior to the time when transmissions are expected on the paging channel (PCH), the access terminal 104 wakes up and enters a warm-up period 402. During the warm-up period 402, the access terminal 104 begins warming up (e.g., powering ON) one or more receiver components. Following the warm-up period 402, the access terminal 104 enters a reacquisition period 404 where the access terminal 104 acquires a suitable pilot signal. After a suitable pilot is discovered and following a slot boundary indicating the start of the slot, the access terminal 104 can receive transmissions (e.g., general page messages) over the paging channel (PCH) during the slot 406.

During the reacquisition period 404, the access terminal 104 generally scans pilot signals transmitted from cells identified in its active set and its neighbor set to find a suitable pilot signal. The active set refers to a set of cells that are currently active from the point of view of the access terminal 104. The neighbor set refers to a set of cells neighboring the most recent serving cell. The duration of time that the access terminal 104 employs for a reacquisition scan is typically defined by an active set window (ASW). The value for the active set window (ASW) may be obtained by the access terminal 104 in an overhead message such as a system parameters message, and is typically designated by the network operator. For example, on a network operated by Verizon Wireless in the United States of America, the duration of the active set window is 40 chips. On a network operated by Sprint in the United States of America, the duration of the active set window is 28 chips. On a network operated by China Telecom in China, the duration of the active set window is 60 chips. Other networks can have varying ASW settings. In some scenarios, ASW time periods can be retrieved from a storage medium (e.g., a register or other form of memory).

As depicted in FIG. 4, the reacquisition period 404 may conventionally maintain a constant duration for each awake state 400 according to the designated duration of the active set window (e.g., 40 chips, 28 chips, 60 chips). The duration of the reacquisition period 404 as defined by the active set window can affect power consumption at the access terminal 104. For instance, a longer duration results in a longer scan and more power consumption. Conversely, a shorter duration results in a shorter scan and less power consumption. Moreover, a longer duration provides the access terminal 104 with a longer time to acquire the strongest pilot signal, which may affect performance.

In other systems, such as wideband CDMA (WCDMA), an access terminal 104 may search for a strongest pseudorandom noise (PN) signal in a manner similar to that described above for searching for pilot signals. For instance, the access terminal 104 may search for the strongest PN signal using a reacquisition period 404 of a constant duration. In other instances, the access terminal 104 may store the PN positions of a predefined number of the strongest PN signals (e.g., the four strongest PN signals) during a reacquisition procedure and before going back to sleep. For the reacquisition period 404 of the subsequent awake state 400, the access terminal 104 estimates the signal strength for the stored PN positions and latches on to the strongest of the stored PN positions.

In some instances, an access terminal 104 may be stationary or substantially stationary. One example of a stationary or substantially stationary access terminal 104 includes an access terminal 104 adapted for machine-to-machine (M2M) communications (also sometimes referred to as machine-type communication (MTC)). An M2M adapted access terminal 104 may be adapted to wirelessly communicate with one or more devices over the wireless communication system 100, at least substantially without user interaction. M2M access terminals 104 may include a communications device adapted to capture an event (e.g., a sensor that captures temperature, a meter to capture inventory level, etc.), which is relayed through the wireless communication system 100 to an application (e.g., software program). Event data can be translated into meaningful information (e.g., temperature needs to be lowered/raised, items need to be restocked, device power on/off states, throttling of power usage, etc.). M2M access terminals 104 are sometimes permanently stationary. By way of example and not limitation, an M2M access terminal 104 may include a thermostat, an electric meter, a gas meter, a water meter, a sprinkler system, a smart-meter, an appliance, an alarm system, etc. In some scenarios, M2M access terminals can be mobile or have varying alternating states of mobile and stationary arrangements.

Such stationary or substantially stationary access terminals 104 can communicate with the same base station 102 or group of base stations 102 over a relatively extensive period of time. As a result of using the same base station(s) 102, the access terminal 104 may already know which pilot signal(s) (or PN signal(s)) will likely be the strongest. Such access terminals 104 can benefit from the ability to modify one or more parameters for the reacquisition procedures to conserve power. For example, access terminals 104 can conserve power by modifying a reacquisition period 404 to a shorter duration, or by modifying the number of PNs and PN positions stored during a previous page slot. According to at least one aspect of the disclosure, access terminals are adapted to facilitate power conservation by systematically adjusting one or more parameters for reacquisition procedures associated with an awake state of a slotted idle mode. In at least some examples, these features can be implemented with programming employed at the physical layer 302 of the protocol stack referred to above with reference to FIG. 3. In some scenarios, systematic adjustments can include iteratively deviating from an initial ASW time period in a dynamic manner (e.g., increasing or decreasing ASW time period in an iterative manner).

Figure 5:
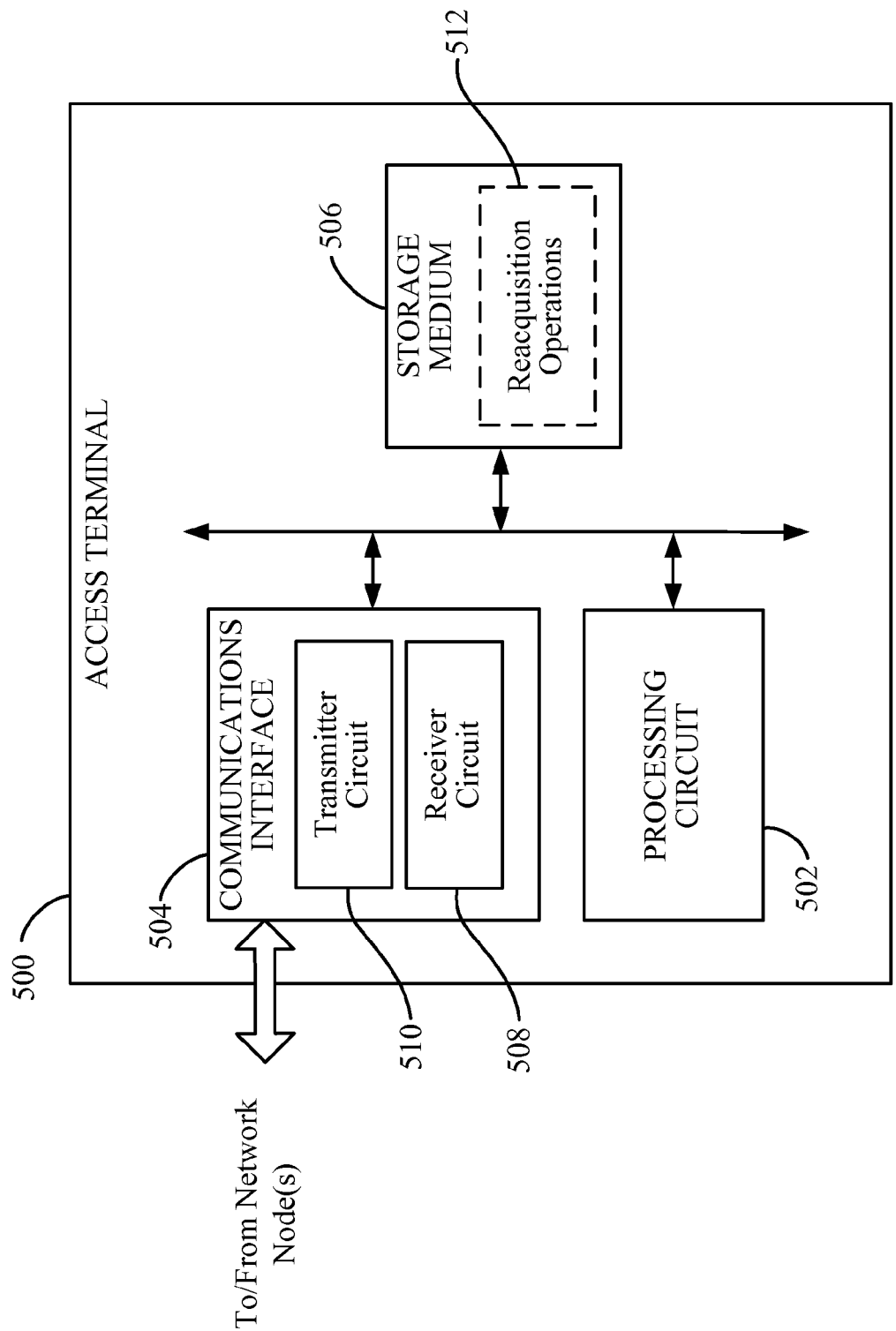
FIG. 5 is a block diagram illustrating select components of an access terminal according to some embodiments.

Turning to FIG. 5, a block diagram is shown illustrating select components of an access terminal 500 according to at least one example of the present disclosure. The access terminal 500 includes a processing circuit 502 coupled to or placed in electrical communication with a communications interface 504 and a storage medium 506.

The processing circuit 502 is arranged to obtain, process and/or send data, control data access and storage, issue commands, and control other desired operations. The processing circuit 502 may include circuitry adapted to implement desired programming provided by appropriate media in at least one example. For example, the processing circuit 502 may be implemented as one or more processors, one or more controllers, and/or other structure configured to execute executable programming. Examples of the processing circuit 502 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 502 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 502 are for illustration and other suitable configurations within the scope of the present disclosure are also contemplated.

The processing circuit 502 is adapted for processing, including the execution of programming, which may be stored on the storage medium 506. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 504 is configured to facilitate wireless communications of the access terminal 500. For example, the communications interface 504 may include circuitry and/or programming adapted to facilitate the communication of information bi-directionally with respect to one or more wireless network devices (e.g., network nodes). The communications interface 504 may be coupled to one or more antennas (not shown), and includes wireless transceiver circuitry, including at least one receiver circuit 508 (e.g., one or more receiver chains) and/or at least one transmitter circuit 510 (e.g., one or more transmitter chains).

The storage medium 506 may represent one or more computer-readable, machine-readable, and/or processor-readable devices for storing programming, such as processor executable code or instructions (e.g., software, firmware), electronic data, databases, or other digital information. The storage medium 506 may also be used for storing data that is manipulated by the processing circuit 502 when executing programming. The storage medium 506 may be any available media that can be accessed by a general purpose or special purpose processor, including portable or fixed storage devices, optical storage devices, and various other mediums capable of storing, containing and/or carrying programming. By way of example and not limitation, the storage medium 506 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 506 may be coupled to the processing circuit 502 such that the processing circuit 502 can read information from, and write information to, the storage medium 506. That is, the storage medium 506 can be coupled to the processing circuit 502 so that the storage medium 506 is at least accessible by the processing circuit 502, including examples where the storage medium 506 is integral to the processing circuit 502 and/or examples where the storage medium 506 is separate from the processing circuit 502 (e.g., resident in the access terminal 500, external to the access terminal 500, distributed across multiple entities).

Programming stored by the storage medium 506, when executed by the processing circuit 502, causes the processing circuit 502 to perform one or more of the various functions and/or process steps described herein. For example, the storage medium 506 may include reacquisition operations 512 adapted to cause the processing circuit 502 to employ one or more optimized parameters for reacquisition procedures as described herein. The reacquisition operations 512 may include a reacquisition module. Such optimized parameters may include, for example, an optimized duration for a reacquisition period, an optimized number of PNs and PN positions stored during each page slot, etc. Thus, according to one or more aspects of the present disclosure, the processing circuit 502 is adapted to perform (in conjunction with the storage medium 506) any or all of the processes, functions, steps and/or routines for any or all of the access terminals (e.g., access terminal 104, access terminal 500) described herein. As used herein, the term "adapted" in relation to the processing circuit 502 may refer to the processing circuit 502 being one or more of configured, employed, implemented, and/or programmed (in conjunction with the reacquisition operations 512) to perform a particular process, function, step and/or routine according to various features described herein.

In operation, the access terminal 500 can modify or adjust one or more parameters for reacquisition procedures. In one example, the access terminal 500 can systematically adjust the length of time (or duration) for the reacquisition periods until an optimized length of time is discovered. As discussed above and below, adjustments for ASW time periods can be modified in an iterative fashion. Adjustments can be made by decreasing and/or increasing ASW time periods to reach an optimal ASW time period. Generally, an optimal time period is a time period that provides adequate time for a successful reacquisition while at the same time not unnecessarily prolonging an ASW time period after a reacquisition has occurred. In effect, the optimal time period is long enough so that reacquisition occurs yet not long enough to remain in ASW post reacquisition.

Figure 6:
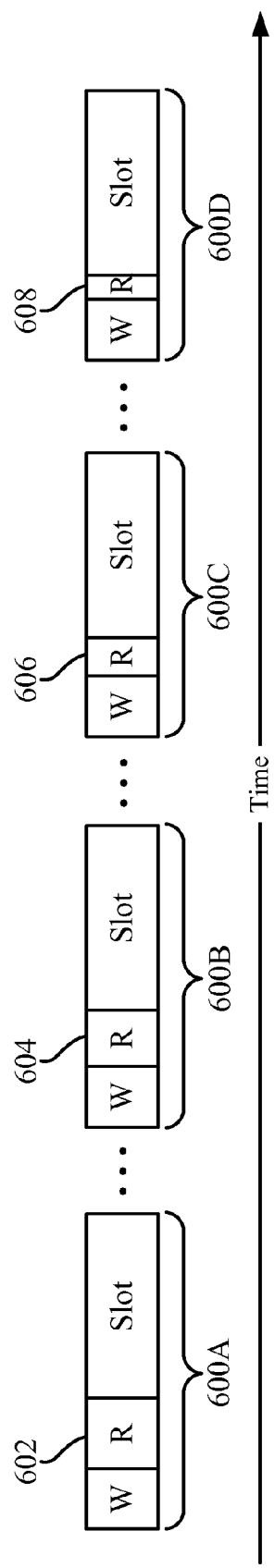
FIG. 6 is a block diagram illustrating an example of systematically reducing reacquisition periods according to some embodiments.

FIG. 6 is a block diagram illustrating an example of systematically reducing the reacquisition periods. As shown, the access terminal 500 cycles through a plurality of awake states 600A-600D. In a first awake state 600A, the access terminal 500 employs an initial duration for the reacquisition period 602. This initial duration may be the default duration specified by the network. Or an initial duration may be the last used optimized duration when the access terminal 500 is performing a new determination to ensure that the duration is the most optimized. In other scenarios, embodiments of the present invention may store a plurality of previously utilized optimized ASW time periods, and these stored ASW time periods may be utilized as initial duration periods.

According to an aspect of the present disclosure, when the reacquisition is successful, the access terminal 500 can be adapted to reduce the length of time for the reacquisition periods by a predetermined amount. As shown in FIG. 6, the next awake state 600B can then employ a reduced duration for the reacquisition period 604. In this example, it is assumed that the reacquisition period 604 resulted in a successful reacquisition. Accordingly, the duration can be reduced again by a predetermined amount and the next awake state 600C can employ the newly reduced duration for the reacquisition period 606. Again, the duration can be reduced by a predetermined amount for the next awake state 600D, where the further reduced duration for the reacquisition period 608 is employed. Reduction in the length of time to be employed for reacquisition periods can continue to be reduced until a reacquisition procedure is unsuccessful. When an unsuccessful reacquisition occurs (e.g., the access terminal 500 does not acquire the strongest pilot signal or PN signal), the access terminal 500 can return the duration to the last successful duration and can identify it as the optimized length of time for reacquisition periods. The access terminal 500 can then employ this optimized duration for subsequent reacquisition periods.

In other examples, the access terminal 500 can similarly adjust the number of PN signals and PN positions stored during an awake state 600 for use in a reacquisition procedure in a subsequent awake state 600. For example, the access terminal 500 may begin with a default number of PNs, such as four (4) PN signals. The access terminal 500 may initially store the PN signals and PN positions for all four PN signals. When the subsequent reacquisition procedure is successful, the access terminal 500 can store the three (3) strongest PN signals and PN positions. This can continue until the access terminal 500 only stores one (1) PN signal and PN position if such information is repeatedly successful in performing reacquisition procedures.

Figure 7:
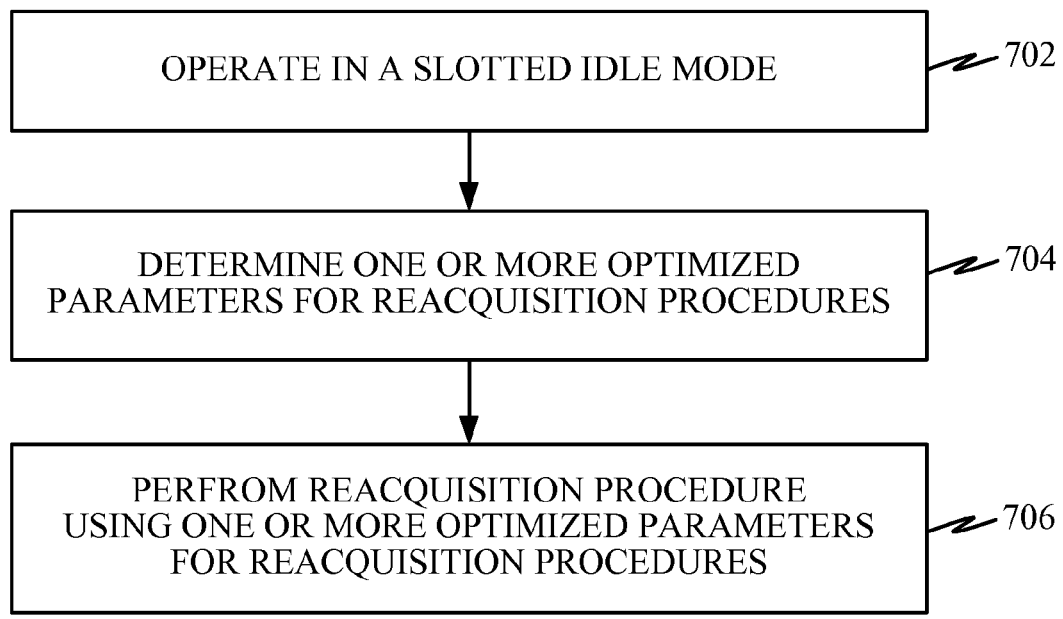
FIG. 7 is a flow diagram illustrating a method operational on an access terminal according to some embodiments.

FIG. 7 is a flow diagram illustrating at least one example of a method operational on an access terminal, such as the access terminal 500. Referring to FIGS. 5 and 7, an access terminal 500 can operate in a slotted idle mode at step 702. For example, the processing circuit 502 can operate in a slotted idle mode, which may also be referred to as a discontinuous reception (DRX) mode. This may include the processing circuit 502 powering down or OFF one or more components to reduce power consumption at the access terminal 500. According to some relevant operating standards (e.g., CDMA 2000 1×, WCDMA) and as described above, the processing circuit 502 can alternate between a sleep state and an awake state. During the awake state, the processing circuit 502 can monitor a paging channel (PCH) via the receiver circuit 508 of the communications interface 504 for various messages.

At step 704, the access terminal 500 can determine one or more optimized parameters for reacquisition procedures. For example, the processing circuit 502 executing the reacquisition operations 512 can determine one or more optimized parameters for reacquisition procedures employed during the slotted idle mode. By way of example and not limitation, the one or more parameters may include a duration for the reacquisition period and/or a number of pseudorandom noise (PN) signals and PN positions that the processing circuit 502 stores in the storage medium 506 for use in a subsequent reacquisition procedure.

In some scenarios where a parameter for reacquisition procedures includes a length of time for reacquisition periods, the processing circuit 502 executing the reacquisition operations 512 can incrementally reduce the duration of the reacquisition periods by a predetermined value for each time that a reacquisition procedure is successful. This process can begin with an initial duration and may end when a reacquisition procedure is unsuccessful. In response to the unsuccessful reacquisition procedure, the processing circuit 502 executing the reacquisition operations 512 can return the duration back to the last successful value. This last successful duration can be set by the processing circuit 502 executing the reacquisition operations 512 as the optimized duration for reacquisition periods. In some embodiments, multiple time period data can be stored in memory for later analysis or use in reacquisition.

Figure 8:
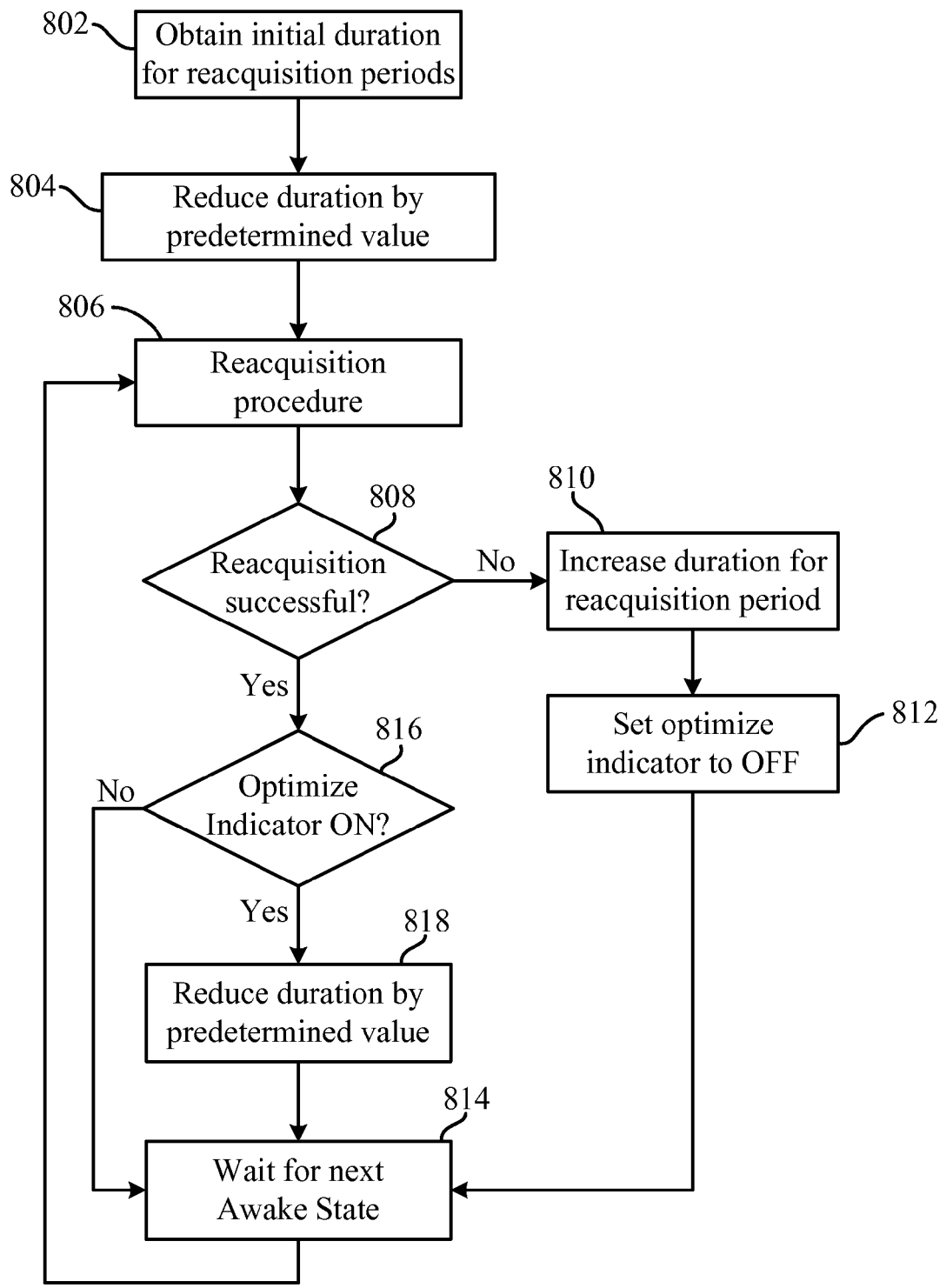
FIG. 8 is a flow diagram depicting various steps of an algorithm for determining an optimized length of time for reacquisition periods according to some embodiments.

FIG. 8 is a flow diagram depicting various steps of an algorithm that may be implemented as programming (e.g., a part of the reacquisition operations 512) executed by the processing circuit 502 for determining an optimized length of time for reacquisition periods according to at least one example. Initially, the processing circuit 502 executing the reacquisition operations 512 can obtain an initial value for the duration of reacquisition periods at step 802. In some examples, this initial value may be obtained from the storage medium 506. In other examples, this initial value may be obtained from a transmission received via the communications interface 504. The initial value may be a default duration specified by the network for reacquisition periods, or the initial value may be a previously employed optimized value where the processing circuit 502 is re-determining the optimized value to ensure it is still a desirable value.

At step 804, the initial duration can be reduced by a predefined value. The specific value may be any desired value. For example, the value may be a fraction or percentage of the current duration (e.g., one-half, one-third), a constant amount of time (e.g., x seconds, one chip, two chips, five chips, ten chips), or any other suitable value. The processing circuit 502 executing the reacquisition operations 512 may reduce the reacquisition period after an initially successful reacquisition procedure using the initial duration for the reacquisition period, or the initial duration may simply be reduced prior to a reacquisition procedure.

At step 806, a reacquisition procedure is performed using the reduced length of time for the reacquisition period. At least some of the processes performed for the reacquisition procedure are described above with reference to FIG. 4. In general, the processing circuit 502 executing the reacquisition operations 512 can scan pilot signals or PN signals to identify a suitable signal on which the monitor the paging channel (PCH).

At decision diamond 808, a determination is made whether the reacquisition was successful. For example, the processing circuit 502 executing the reacquisition operations 512 can determine whether the suitable pilot signal or PN signal was identified. If the reacquisition procedure was not successful, then the duration for the reacquisition periods is increased at step 810. In some examples, the length of time for the reacquisition periods can be increased by the same predefined value by which it was decreased at step 804. For instance, if the duration was decreased at step 804 by one-half, then the duration can be increased by two times at step 810. At step 812, an optimization indicator can be set to OFF. The optimization indicator may be a flag or other indicator adapted to signal to the processing circuit 502 whether an optimized duration should be determined. When the indicator is set to OFF, the processing circuit 502 can know that the current duration for the reacquisition periods is the optimized length of time and no modifications should be made. With the optimization indicator set to OFF and the optimized length of time determined, the processing circuit 502 can go to sleep and wait for the next awake state at step 814.

On the other hand, if the reacquisition procedure was determined to have been successful at decision diamond 808, then a determination is made whether the optimization indicator is ON at decision diamond 810. If the indicator is set to OFF, the processing circuit 502 can go to sleep and wait for the next awake state at step 814. On the other hand, if the optimization indicator is set to ON, the processing circuit 502 executing the reacquisition operations 512 can know that the optimized length of time for the reacquisition periods is still being determined. Accordingly, the processing circuit 502 executing the reacquisition operations 512 can go to step 818 where the duration for the reacquisition periods is reduced by a predetermined value. The processing circuit 502 then waits for the next awake state at step 814.

When the next awake state arrives, a reacquisition procedure is once again performed at step 806 using the most recent length of time for the acquisition periods. In this manner, the length of time for the acquisition periods can be incrementally modified (e.g., reduced and/or increased) until an optimized length of time is determined. In some examples, after an optimized duration for the acquisition periods has been determined, and the optimization indicator has been set to OFF, a timer may be set to reset the optimization indicator back to ON after a predefined period of time. For example, the processing circuit 502 executing the reacquisition operations 512 may set a timer so that every so often (e.g., every 1 hour, 12 hours, 1 day, etc.) the access terminal 500 can restart the process for determining an optimized duration for the reacquisition periods by going from step 816 to step 818 and not from step 816 to step 814 in FIG. 8.

Referring again to FIG. 7, in some examples the one or more parameters may include a number of pseudorandom noise (PN) signals and PN positions that the processing circuit 502 stores in the storage medium 506 for use in a subsequent reacquisition procedure. In such examples, the processing circuit 502 executing the reacquisition operations 512 can incrementally decrease the number of PN signals and PN positions until an optimized number of PN signals and PN positions is determined. For example, the processing circuit 502 executing the reacquisition operations 512 may initially store four PN signals and PN positions during each awake state. During the next awake state, the processing circuit 502 executing the reacquisition operations 512 may reduce the number and store only three PN signals and PN positions. During the next awake state, if the three PN signals and PN positions are successful, then the processing circuit 502 executing the reacquisition operations 512 may reduce to two PN signals and PN positions. This can continue until the number of stored PN signals and PN positions is not successful in performing a reacquisition procedure. When this occurs, the processing circuit 502 executing the reacquisition operations 512 can increment the number of stored PN signals and PN positions by one and identify this number as the optimized number of PN signals and PN positions.

At step 706 of the method in FIG. 7, the access terminal 500 can perform one or more reacquisition procedures using the one or more optimized parameters for the reacquisition procedure. For example, the processing circuit 502 executing the reacquisition operations 512 can perform a reacquisition procedure using the one or more optimized parameters. For instance, the processing circuit 502 executing the reacquisition operations 512 may employ the optimized length of time for the reacquisition period so that the reacquisition period is significantly shorter, reducing the amount of time that the access terminal 500 is in the awake state. In another instance, the processing circuit 502 executing the reacquisition operations 512 may employ the optimized number of PN signals and PN positions so that fewer PN signals are monitored and stored, reducing the amount of time the scan occurs and the amount of power used.

Employing one or more of the features described herein may significantly improve power savings in wireless communications devices. In addition, for stationary devices, such as M2M enabled access terminals, that spend a significant amount of time operating in a slotted idle mode, such optimizations can result in significant power conservation over the course of a long period of time.

While the above discussed aspects, arrangements, and embodiments are discussed with specific details and particularity, one or more of the components, steps, features and/or functions illustrated in FIGS. 1, 2, 3, 4, 5, 6, 7 and/or 8 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2 and/or 5 may be configured to perform or employ one or more of the methods, features, parameters, and/or steps described in FIGS. 3, 4, 6, 7 and/or 8. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

We claim:

1. A power-conserving wireless communication device, comprising:
a storage medium comprising programming; and
a processing circuit operably coupled to the storage medium, the processing circuit adapted to execute the programming to:
operate in a slotted idle mode; and
determine one or more optimized duration for reacquisition periods based on a success of reacquisition during a preceding reacquisition procedure by:
beginning with an initial duration for the reacquisition periods,
incrementally decreasing the initial duration for the reacquisition periods by a predetermined value after each successful reacquisition procedure until a reacquisition procedure is unsuccessful,
in response to the unsuccessful reacquisition procedure, increasing a duration associated with the unsuccessful reacquisition procedure by the predetermined value to obtain an optimized duration for the reacquisition periods, and
determining a duration associated with a last successful reacquisition procedure to be the optimized duration for the reacquisition periods.

2. The device of claim 1, wherein the duration for the reacquisition periods comprises a length of time for the reacquisition periods, and the processing circuit is further adapted to: systematically adjust the length of time for the reacquisition periods until an optimized length of time is obtained.

3. The device of claim 2, wherein the processing circuit is further adapted to: systematically adjust the length of time by systematically reducing the length of time by a predetermined quantity until the optimized length of time is obtained.

4. The device of claim 2, wherein the optimized length of time for the reacquisition periods is shorter than a default length of time for the reacquisition periods.

5. The device of claim 1, wherein the duration for the reacquisition periods corresponds to a number of pseudorandom noise (PN) signals and PN positions stored in the storage medium for each reacquisition procedure, and the processing circuit is further adapted to:
systematically reduce the number of PN signals and PN positions stored in the storage medium for each reacquisition procedure until an optimized number of PN signals and PN positions is obtained.

6. An access terminal, comprising:
a communications interface;
a storage medium; and
a processing circuit coupled to the communications interface and to the storage medium, the processing circuit adapted to:
determine an optimized duration for reacquisition periods based on a success of reacquisition during a preceding reacquisition procedure by:
obtain a default duration for the reacquisition periods,
incrementally decreasing the default duration for the reacquisition periods by a predetermined value after each successful reacquisition procedure until a reacquisition procedure is unsuccessful,
in response to the unsuccessful reacquisition procedure, increasing a duration associated with the unsuccessful reacquisition procedure by the predetermined value to determine an optimized duration for the reacquisition periods, and
determining a duration associated with a last successful reacquisition procedure to be the optimized duration for the reacquisition periods; and
perform a reacquisition procedure using the optimized duration for the reacquisition periods.

7. The access terminal of claim 6, wherein the optimized duration for the reacquisition periods is shorter than the default duration.

8. The access terminal of claim 6, wherein the default duration for the reacquisition periods is obtained from a transmission received via the communications interface.

9. The access terminal of claim 6, wherein the processing circuit is further adapted to: initiate another determination for another optimized duration for the reacquisition periods after expiration of a re-determination timer.

10. A method operational on an access terminal, the method comprising:
operating in a slotted idle mode; and
determining an optimized duration for reacquisition periods based on a success of reacquisition during a preceding reacquisition procedure by:
beginning with an initial duration for the reacquisition periods,
incrementally decreasing the initial duration for the reacquisition periods by a predetermined value after each successful reacquisition procedure until a reacquisition procedure is unsuccessful,
in response to the unsuccessful reacquisition procedure, increasing a duration associated with the unsuccessful reacquisition procedure by the predetermined value to determine an optimized duration for the reacquisition periods, and
determining a duration associated with a last successful reacquisition procedure to be the optimized duration for the reacquisition periods.

11. The method of claim 10, further comprising:
receiving a transmission including information indicating a default length of time to be employed for the reacquisition periods, wherein the default length of time is longer than the optimized length of time.

12. The method of claim 10, wherein the determining the optimized duration for the reacquisition periods comprises:
determining an optimized number of pseudorandom noise (PN) signals and PN positions to store for use in a subsequent reacquisition procedure.

13. The method of claim 10, further comprising:
performing a reacquisition procedure employing the optimized duration for the reacquisition periods.

14. An access terminal, comprising:
means for operating in a slotted idle mode; and
means for determining one or more optimized parameters for reacquisition procedures based on a success of reacquisition during a preceding reacquisition procedure, wherein the means for determining one or more optimized parameters for the reacquisition procedures is configured to:
determine an optimized duration for the reacquisition periods by:
beginning with an initial duration for the reacquisition periods,
incrementally decreasing the initial duration for the reacquisition periods by a predetermined value after each successful reacquisition procedure until a reacquisition procedure is unsuccessful, and
in response to the unsuccessful reacquisition procedure, increasing a duration associated with the unsuccessful reacquisition procedure by the predetermined value to obtain an optimized duration for the reacquisition periods, and
determining a duration associated with a last successful reacquisition procedure to be the optimized duration for the reacquisition periods.

15. The access terminal of claim 14, wherein the determination of one or more parameters for the reacquisition procedures comprises a determination of an optimized length of time for the reacquisition periods.

16. The access terminal of claim 15, further comprising:
means for receiving a transmission including information indicating a default length of time to be employed for the reacquisition periods, wherein the default length of time is longer than the optimized length of time.

17. The access terminal of claim 14, wherein the determination of one or more parameters for the reacquisition procedures comprises a determination of an optimized number of pseudorandom noise (PN) signals and PN positions to store for use in a subsequent reacquisition procedure.

18. The access terminal of claim 14, further comprising:
means for employing the one or more optimized parameters for the reacquisition procedures.

19. A non-transitory computer-readable storage medium, comprising programming for causing a computer to:
operate in a slotted idle mode; and
determine an optimized duration for reacquisition periods based on a success of reacquisition during a preceding reacquisition procedure by:
beginning with an initial duration for the reacquisition periods,
incrementally decreasing the initial duration for the reacquisition periods by a predetermined value after each successful reacquisition procedure until a reacquisition procedure is unsuccessful,
in response to the unsuccessful reacquisition procedure, increasing a duration associated with the unsuccessful reacquisition procedure by the predetermined value to determine an optimized duration for the reacquisition periods, and
determining a duration associated with a last successful reacquisition procedure to be the optimized duration for the reacquisition periods.

20. The non-transitory computer-readable storage medium of claim 19, wherein the programming for causing the computer to determine the optimized duration for the reacquisition periods comprises programming for causing the computer to:
determine an optimized number of pseudorandom noise (PN) signals and PN positions to store for use in a subsequent reacquisition procedure.

21. The non-transitory computer-readable storage medium of claim 19, further comprising programming for causing the computer to:
perform a reacquisition procedure employing the optimized duration for the reacquisition periods.

22. A method of wireless communication operable at an access terminal operating in a slotted mode, the method comprising:
determining an optimized duration for reacquisition periods based on a success of reacquisition during a preceding reacquisition procedure by:
obtaining a default duration for the reacquisition periods,
incrementally decreasing the default duration for the reacquisition periods by a predetermined value after each successful reacquisition procedure until a reacquisition procedure is unsuccessful,
in response to the unsuccessful reacquisition procedure, increasing a duration associated with the unsuccessful reacquisition procedure by the predetermined value to determine the optimized duration for the reacquisition periods, and determining a duration associated with a last successful reacquisition procedure to be the optimized duration for the reacquisition periods; and performing a reacquisition procedure using the optimized duration for the reacquisition periods.

23. In a communication system comprising components configured for wireless communication, a communication device comprising:

a reacquisition module configured to obtain a default duration for reacquisition periods; and a processor configured to:
- determine an optimized duration for the reacquisition periods based on a success of reacquisition during a preceding reacquisition procedure by:
  - incrementally decreasing the default duration of the reacquisition periods by a predetermined value after each successful reacquisition procedure until a reacquisition procedure is unsuccessful, and
  - in response to the unsuccessful reacquisition procedure, increasing a duration associated with the unsuccessful reacquisition procedure by the predetermined value to determine an optimized duration for the reacquisition periods, and
- determining a duration associated with a last successful reacquisition procedure to be the optimized duration for the reacquisition periods; and
- perform a reacquisition procedure using the optimized duration for the reacquisition periods.

* * * * *